April 16, 1957 L. LEWIS 2,788,987
AUXILIARY SPRING DEVICE FOR MOTOR VEHICLES
Filed July 19, 1954 2 Sheets-Sheet 1
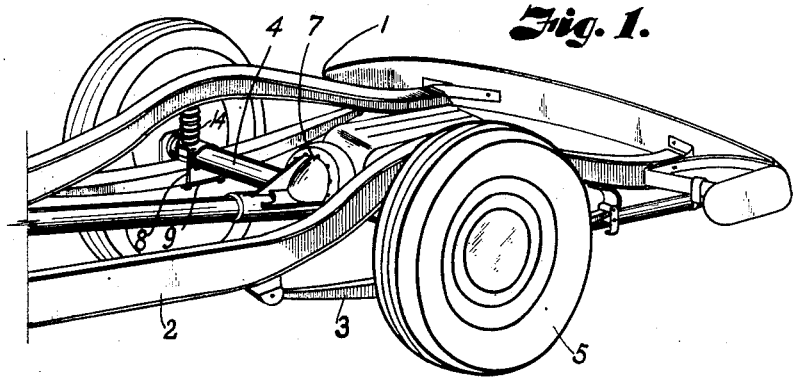
Fig. 1.
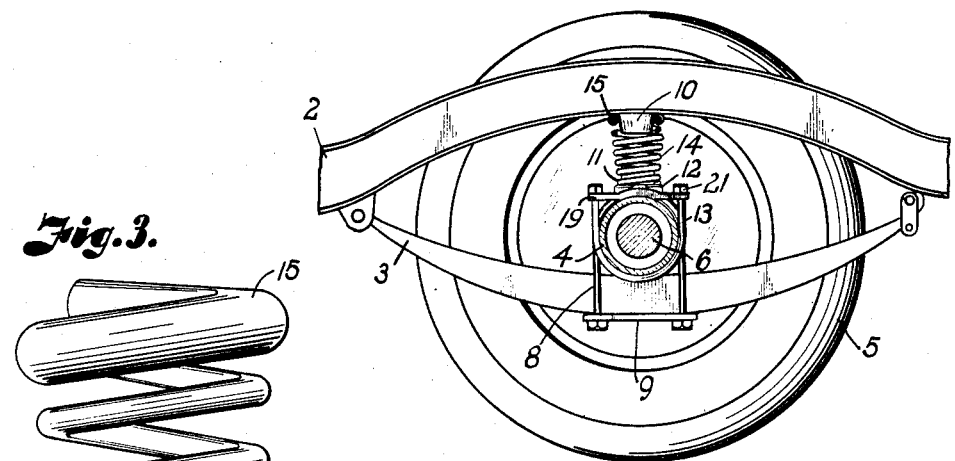
Fig. 2.
Fig. 3.
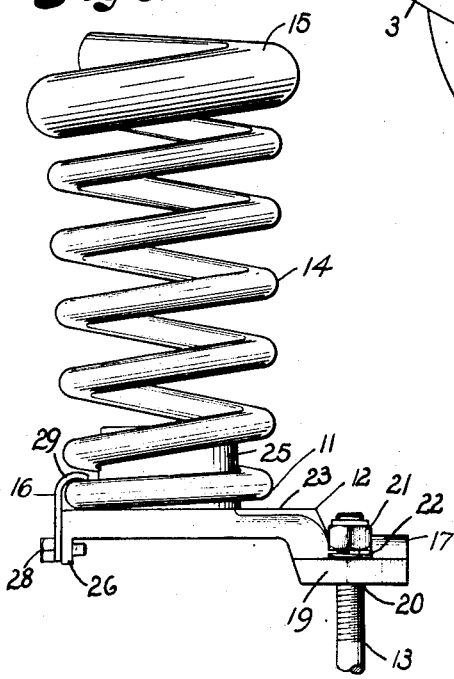
INVENTOR.
Larry Lewis.
BY
Fishburn & Mullendore
ATTORNEYS.

April 16, 1957 L. LEWIS 2,788,987
AUXILIARY SPRING DEVICE FOR MOTOR VEHICLES
Filed July 19, 1954 2 Sheets-Sheet 2

INVENTOR.
Larry Lewis.
BY
Fishburn & Mullendore
ATTORNEYS.

United States Patent Office 2,788,987
Patented Apr. 16, 1957

2,788,987
AUXILIARY SPRING DEVICE FOR MOTOR VEHICLES

Larry Lewis, Kansas City, Mo.

Application July 19, 1954, Serial No. 444,311

2 Claims. (Cl. 280—124)

This invention relates to auxiliary spring devices for motor vehicles and more particularly to such structures that are installed between the side frame members and the rear axle of the vehicle for supplementing the ordinary leaf or coil springs and withstanding shocks, overloading and the like.

The objects of the present invention are to provide an auxiliary spring device with a mounting on the rear axle of a motor vehicle which cooperates with the usual rubber bumpers on the frame in centering and removably supporting the auxiliary springs thereon; to provide such a spring device wherein a saddle or base member is mounted on the rear axle with a spring seat under and aligned with the rubber bumper on the frame whereby the auxiliary spring is installed or removed by merely jacking up the vehicle; to provide such a spring device wherein the spring is retained on the saddle or base member to prevent dislodgment of the spring when bumps cause excessive relative movement of the frame away from the rear axle; to provide an auxiliary spring device which acts to limit and cushion movement of the frame toward the axle only; and to provide a simple, efficient auxiliary spring device for motor vehicles that is economical to manufacture and quickly and easily installed on the rear axle of a motor vehicle by inexperienced labor.

In accomplishing these and other objects of the present invention, I have provided improved details of structure, the preferred forms of which are illustrated in the accompanying drawings, wherein:

Fig. 1 is a fragmentary perspective view of the rear portion of a motor vehicle chassis with auxiliary spring devices embodying the present invention installed between the side frame members and the rear axle.

Fig. 2 is a side elevation of the auxiliary spring showing same in position on the chassis of a motor vehicle.

Fig. 3 is an enlarged elevational view of the auxiliary spring device.

Figure 4:
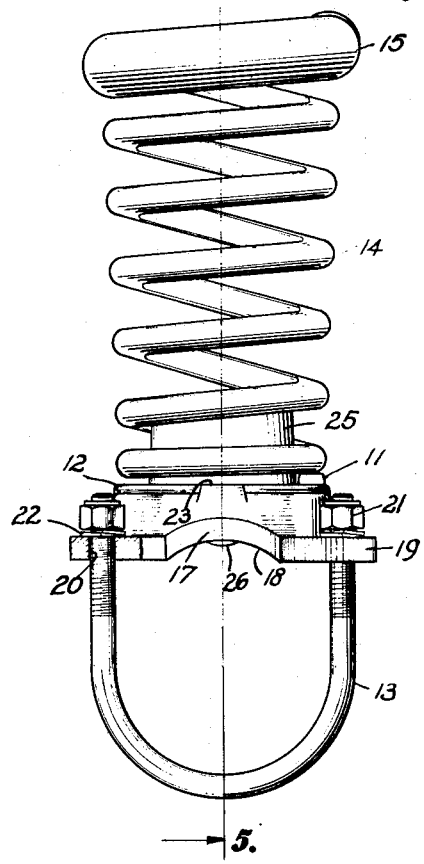
Fig. 4 is a side elevational view of the spring device.
Figure 5:
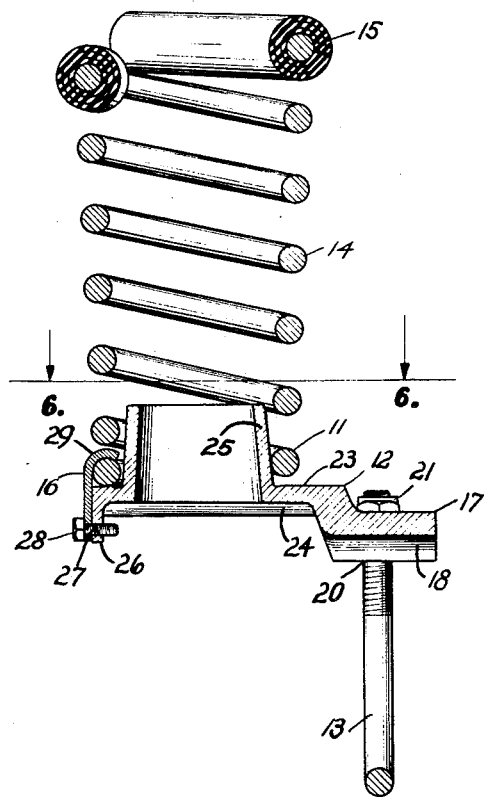
Fig. 5 is a vertical sectional view through the spring device on the line 5—5, Fig. 4.
Figure 6:
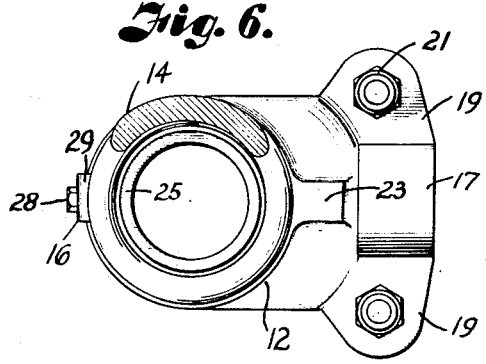
Fig. 6 is a horizontal sectional view through the spring device on the line 6—6, Fig. 5.

Referring more in detail to the drawings:

1 designates a motor vehicle chassis which includes side frame members 2, conventional leaf or semi-elliptic springs 3 between the side frames 2 and rear axle housing 4. Rear traction wheels 5 are carried by driven rear axles 6 mounted in the housing 4 and driven by a differential gearing in a differential housing 7. The semi-elliptical or leaf springs 3 are secured to the rear axle housing 4 by means of U-bolts 8 and suitable mounting plates 9 or the like whereby the axle is positioned below a rubber bumper 10 on the car frame. The purpose of the bumper 10 is to prevent the axle housing 4 from striking the frame when the vehicle is overloaded or is subjected to excessive shocks in traveling over rough roads.

The auxiliary spring devices 11 each include a saddle or base plate 12, suitable fastening devices 13, such as U-bolts or the like, a coil or helical compression spring 14, a resilient sleeve 15 and a clamp 16. The saddle or base plate 12 has an arcuate portion 17 having an under face 18 adapted to seat on the axle housing 4. The arcuate portion 17 terminates in ears 19. The ears each have apertures 20 through which extend threaded ends of the U-bolts 13 which are of such size as to extend around the rear axle housing 4. Suitable nuts 21 and washers 22 are arranged on the ends of the U-bolts to clamp the arcuate portions 17 in tight engagement with the axle housing 4.

A plate member or extension 23 is arranged on one side of the arcuate member 17 and is preferably integral therewith. The plate member or extension is offset upwardly from the arcuate member whereby the under face 24 of the extension is adapted to extend over and rest on the U-bolts 8 or other conventional mounting member which cooperates in securing the semi-elliptical springs 3 to the rear axle housing 4. An upstanding circular boss or spring centering member 25 is arranged on the extension 23 and is preferably hollow for lightness in weight. The boss 25 is so positioned that when the extension extends over the U-bolts 8 said boss is substantially directly below the rubber bumpers 10 on the frame, and said boss is of suitable size and shape whereby the lower end of the spring 14 may be sleeved thereover with the lowermost convolution of the spring engaging or seating on the extension 23. An ear 26 depends from the extension 23, preferably remotely of the arcuate member 17, and is provided with a threaded aperture 27 for receiving a suitable fastening device, such as a screw 28, for securing the clamp 16 thereto, said clamp preferably being a plate having a curved portion 29 at the upper end thereof adapted to extend over and engage the lowermost convolution of the spring 14 to retain same in position on the base plate or saddle 12.

The resilient sleeve 15 is sleeved over the uppermost convolution of the spring 14, said spring at the upper end being of suitable diameter and the sleeve 15 of such thickness that the sleeve 15 engages around and is centered by the rubber bumper 10. The springs 14 are preferably of such length that when the vehicle is jacked up the weight of the wheels 5 and rear axle will pull the semi-elliptic springs 3 downwardly to provide a spacing between the rear axle and the rubber bumpers 10 that is slightly greater than the length of the springs 14 and so that when the weight of the vehicle is on the wheels 5 and the springs 14 are in place, the springs 14 are always compressed.

In installing auxiliary spring devices such as shown and described, the saddles or base plates 12 are arranged on the rear axles with the bosses 25 directly below the rubber bumpers 10. The U-bolts 13 are then placed around the lower portion of the axle housings 4 and the threaded ends thereof extended through the apertures 20 and then the washers 22 and nuts 21 applied to the threaded ends of the U-bolts 13 and tightened into position. The clamps 16 preferably remain on the saddle or base plate 12. This arrangement of base plates does not interfere with the operation of the vehicle in transporting normal loads, and during such times it is not necessary to install the springs 14.

When the vehicle is to be used for transporting heavy loads or it is desirable for any other reason to supplement the ordinary leaf or semi-elliptic springs, the rear of the vehicle is jacked up with a conventional bumper jack, elevating the rear portion of the frame a suitable height, for example six to eight inches. Then the screws 28 are loosened sufficiently to swing the clamp 16 out of the way and the spring 14 is then sleeved on the boss 25 whereby the upper end of the spring 14 and sleeve 15 thereon extend around the lower portion of the bumper 10. The clamp 16 is then moved whereby the curved portion 29 extends over the lower convolution of the spring 14 and the screw 28 tightened to hold the clamp 16 in place. This retains the spring 14 in desired position. Then the bumper jack is operated to lower the frame whereby the rubber bumper 10 enters the upper portion of the spring 14 to complete the installation and the vehicle is then ready for use. The springs 14 can be removed or replaced as desired and the bases 12 remain on the rear axle whereby change from normal use to transportation of heavy loads can be quickly and easily accomplished by unskilled labor.

What I claim and desire to secure by Letters Patent is:

1. In a vehicle including a rear axle housing, side frame members sustained above the rear axle housing by semi-elliptic springs and rubber bumpers on the side frames above the rear axle housing for preventing said axle housing from striking said frames, an auxiliary spring device between each of said side frames and said rear axle housing, each spring device comprising, a base member having a cylindrical recess in the under surface thereof for engaging over and seating on the rear axle housing at one side of and adjacent the semi-elliptic spring, a plate member integral with the base member and extending over the semi-elliptic spring, said plate having an upstanding spring centering boss in vertical alignment with the rubber bumper on the side frame, fastening means extending under the rear axle housing and having connection with the base member for removably securing same to the rear axle housing, a helical compression spring having ends bearing against the plate member and frame and having the boss and rubber bumper received in said spring ends, a depending ear on the plate member remote from the base member, and clamp means removably secured to the ear on the plate member and having a portion extending upwardly over the plate member and terminating in a portion extending inwardly over and engaging the convolution of said helical spring resting on the plate member for removably securing said spring to the plate member.

2. In a vehicle including a rear axle housing, side frame members sustained above the rear axle housing by semi-elliptic springs and rubber bumpers on the side frames above the rear axle housing for preventing said axle housing from striking said frames, an auxiliary spring device between each of the side frames and said rear axle housing, each spring device comprising, a base member having an arcuate portion seating on the rear axle housing at one side of and adjacent to the semi-elliptic spring, an extension on the arcuate portion and extending over the semi-elliptic spring, an upstanding spring centering boss on the extension in vertical alignment with the rubber bumper on the respective side frame, means connected to the arcuate portion of the base member and extending under the rear axle housing for securing the base member thereto, a helical compression spring having ends normally bearing against the extension and frame and having the spring centering boss and rubber bumper received in said spring ends, a resilient sleeve on the uppermost convolution of the spring at the end bearing against the frame and engaging around the rubber bumper, a depending ear on the base member extension remote from the arcuate portion, a clamp member removably secured to the depending ear and extending upwardly therefrom and terminating in a portion extending inwardly over and engaging the convolution of said helical spring resting on said extension for retaining said spring thereon.

References Cited in the file of this patent

UNITED STATES PATENTS

| 1,336,534 | Pardee | Apr. 13, 1920 |
| 2,230,069 | Rushmore | Jan. 28, 1941 |
| 2,431,440 | Willis | Nov. 25, 1947 |
| 2,676,794 | Griffith | Apr. 27, 1954 |